United States Patent [19]

Gorecki et al.

[11] 3,914,205

[45] Oct. 21, 1975

[54] REDUCING POLYMER

[75] Inventors: Marian Gorecki, Givataim;
Abraham Patchornik, Nes-Ziona, both of Israel

[73] Assignee: Yeda Research and Development Co., Ltd., Rehovot, Israel

[22] Filed: Mar. 22, 1974

[21] Appl. No.: 453,761

[52] U.S. Cl............ 260/79; 260/209 R; 260/209 D; 260/215; 260/224
[51] Int. Cl.$^2$......................................... C08F 28/00
[58] Field of Search.......... 260/79, 215, 224, 209 R, 260/209 D

[56] References Cited
UNITED STATES PATENTS 3,278,496  10/1966  LeFave et al......................... 260/79
3,737,415  6/1973  Kenton ................................. 260/79

*Primary Examiner*—Melvyn I. Marquis
*Attorney, Agent, or Firm*—Browdy and Neimark

[57] ABSTRACT

A reducing polymer comprising dihydrolipoic acid bound to a polymeric carrier, the carrier being advantageously a derivative of cellulose, of Sephadex, of Sepharose, of polyacrylamide or of polystyrene. Preferred derivatives used are the amino-(lower alkyl) derivatives. The reducing polymers are produced by covalently binding lipoic acid to a suitable polymeric carrier and reducing the thus obtained polymer. A suitable reducing agent is sodium borohydride.

9 Claims, No Drawings

REDUCING POLYMER

The present invention relates to novel polymeric substances, adapted to reduce disulfide bonds of the type present in peptides containing cysteine and other disulfides, such as oxidized mercaptoethanol or cysteamine, or active disulfide bonds in proteins such as papain.

The invention relates also to a method for preparing such polymeric substances, to columns and other devices containing such novel polymeric substances. Other and further features of the invention will become apparent hereinafter.

The novel polymeric substances according to the invention comprise carrier-bound dihydrolipoic acid. A variety of water-insoluble polymeric carriers may be used. Satisfactory results were obtained with carriers such as cellulose, Sephadex (T.M.), derivatives of polyacrylamide and with aminomethyl polystyrene. Due to their low redox potentials, the above dithiol polymeric compositions are adapted to reduce quantitatively the disulfide bonds in compounds as defined above.

The novel dihydrolipoyl-polymers according to the present invention are produced by first coupling lipoic acid to a suitable polymeric carrier substance, and after this reducing the product obtained with a suitable reducing agent, such as sodium borohydride. The novel substances according to the invention can be schematically represented as follows:

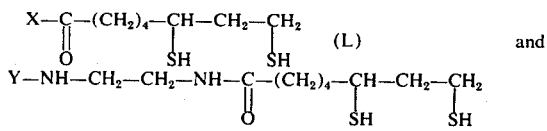

wherein
- X designates aminoethyl cellulose or aminoethyl Sephadex and
- Y designates Sephadex or Sepharose activated with cyanogen bromide.

The following description is intended to describe, by way of example only, the preparation of novel compositions of matter according to the present invention and some of the uses of same.

EXAMPLE 1: Preparation of Reducing Polymer from Sephadex

A quantity of aminoethyl-Sephadex G-25 was prepared according to the method of Reeves & Guthrie, Tex.Res.J.23(1953).522. The polymer contained 0.36 meq amine per gram of dry poweder. A quantity of 25 g of this polymer (coarse or medium grain) was swollen in water and stirred with 3 g (10 m.mole) of lipoly succinimide ester dissolved in 50 ml freshly distilled DMF. The stirring was continued for 2 days, the resulting lipoyl-aminoethyl Sephadex was washed with DMF, ethanol and absolute ethanol and dried in a desiccator. The product contained 2.3 % by weight sulfur and tests indicated that all the amino groups of the starting material were lipoylated.

Lipoyl succinimide ester was derived from lipoic acid by reacting equimolar quantities of lipoic acid, N-hydroxy succinimide and dicyclohexyl carbodiimide dissolved in dioxan: ethyl acetate (3:1). The mixture was stirred during 15 hours, the resulting dicyclohexyl urea was filtered off, the solvent was removed under reduced pressure from the solution. The lipoic acid derivative product was recrystallized from isopropanol, yield: 70 %, M.P.96°–99°C. Analysis: Calculated for $C_{12}H_{15}NO_4S_2$: C = 47.8%; H = 4.98%; N = 4.65%; S = 21.2. C = 47.9%; H = 4.95%; N = 4.6%; S = 20.8%.

EXAMPLE 2: Preparation of Reducing Polymer from cellulose

A quantity of 5 g amino ethyl cellulose (produced by Serva), containing 0.29 meq free amine per gram, was washed with 0.1N sodium hydroxide and afterwards with water. It was lipoylated as set out in Example 1. The reaction was not quantitative, the product contained 80–85% of lipoylated amino groups.

EXAMPLE 3: Preparation of Reducing Polymer based on a Derivative of Polyacrylamide A quantity of the ethylamino derivative of polyacrylamine was prepared according to the procedure of Anderson et al., J.A.C.S. 86 (1969) 1839. The polymer contained 2.1 milli-equivalents of amine per gram of dry polymer. A quantity of 2.0 g of this polymer was lipoylated as set out in Example 1, with 3 m.moles of lipoyl succinimide ester. The resulting polymer contained 0.47 meq of lipoate per gram of dry polymer. In order to decrease the tendency of the product to swell, the remaining amino groups were subsequently acetylated with acetic anhydride in 0.1 M sodium bicarbonate. The acetylation did not decrease the reductive properties of the polymer.

EXAMPLE 4: Preparation of Reductive Polymer from Aminoethyl Polystyrene

A quantity of 2.0 g of aminomethyl polystyrene containing 2 m.moles of amine per gram of polymer, prepared by heating chloromethyl polystyrene with ammonia in an autoclave for 48 hours, was lipoylated with 1 m.mole lipoyl succinimide ester, obtained as described in Example 1. The product contained 0.25 m-moles of lipoic acid per gram of dry polymer. The lipoylation was followed by carbamylation of the remaining amino groups with an excess of potassium cyanate in 1 M phosphate buffer, pH 7.5 during 15 hours. The last stage was quantitative.

EXAMPLE 5: Preparation of Water-Insoluble Polymer

Aminoethyl Sephadex and aminoethyl cellulose used as starting material in Example 1 and 2 were mixed with mixed anhydride prepared according to Bodansky & Ondetti "Peptide Synthesis," Wiley & Sons, New York, 1966, from lipoic acid (2.06 g, 10 m.mole) in DMF (20 ml) with triethylamine (1.4 ml, 10 m.mole) and isobutyl chloroformate (1.35 ml, 10 m.mole).

A quantity of 10 g (2.9 meq), free amine, aminoethyl cellulose in 20 ml DMF and the mixed anhydride derivative of lipoic acid prepared as above were stirred together in an ice bath during 3 hours and afterwards for 10 hours at ambient temperature. The product was then filtered off, washed with 0.1 m HCl, water, ethanol and then dried. The lipoylaminoethyl cellulose contained 1.2 per cent by weight sulfur.

The same procedure with 5 g aminoethyl Sephadex (1.8 meq of free amine) and mixed anhydride prepared from 10 m.moles of lipoic acid, resulted in a product containing 2.1 per cent by weight sulfur.

EXAMPLE 6: Preparation of Reducing Polymer from Sephadex

A quantity of 4 g Sephadex G-25 was swollen in water and activated with 200 mg of cyanogen bromide at pH 11, according to the procedure of Axen et al. Nature 214 (1967) 1304. The activated gel suspended in 7 ml of 0.1 M sodium bicarbonate and 3.3 g (10 m.moles) lipoyl-ethylenediamine hydrobromide were added in 20 ml DMF. The reaction mixture was stirred for 12 hours, the products was washed with 0.1 M sodium bicarbonate, 0.1 M HCl, water, ethanol-water and absolute ethanol. The product contained 3.8 per cent by weight sulfur, corresponding to 0.6 m-moles of lipoic acid per gram of polymer.

EXAMPLE 7: Preparation of Reducing Polymer From Sepharose

A quantity of 20 ml of Sepharose 4 B was lipoylated as in the preceding example, but the last stage was omitted. The polymer contained 0.028 m-moles of lipoic acid per ml of the settled Sepharose (96 percent by weight water content). The polymer was not washed after its preparation with ethanol, and it was used in its swollen state.

EXAMPLE 8: Reduction of Polymer

The reduction of the carrier-bound lipoic acid was effected by means of sodium borohydride, resulting in the thiolated from (dihydrolipoyl polymer). The polymer was swollen in water and a 15-fold excess of the reagent was used. The reaction took 30 minutes. The polymer was washed with 5 % acetic acid to destroy excess of sodium borohydride; washed with water, ethanol and dried in a desiccator.

The free thiol groups were titrated with 5,5'-dithiobis-(2-nitrobenzoic acid) (DTNB) at a pH of 7.3. Results obtained show that the free —SH groups correspond to the sulfur content determined for the polymers.

CHEMICAL PROPERTIES OF THE REDUCED POLYMER

The polymeric substances produced according to the preceding Examples were stable at a pH in the range of 3.0 to 11 and could be used repeatedly without loss of lipoic acid and without destruction of the form of the grains of the polymer.

The reduced polymers were kept in the reduced state for several weeks. When kept under nitrogen, they did not oxidize even during prolonged periods. If kept in an alkaline medium, the polymers are not stable and undergo a change resulting in a loss of activity within a few hours, even in the presence of EDTA.

Ethanol washed and vacuum dried dihydrolipoyl Sephadex is a white insoluble powder which swells in water to form a gel, which has the same properties as regards filterability as the original Sephadex G-25.

The reduction was measured with a number of disulfides chosen as model compounds. The model compounds contained primary amino groups. Amongst others there were tested: cysteamine, cystine and gluthathione.

A sample of 30 μ.mole of the disulfide was dissolved in 1 ml of phosphate or tris-buffer, pH 8.0 and stirred with 100 mg of the reduced polymer prepared according to Example 1 and reduced according to Example 8.

The polymer was first swollen in the same buffer. A stream of nitrogen was passed through the reaction medium in order to maintain anaerobic conditions. After 20 minutes the reaction was complete and a complete reduction had taken place. The polymer was filtered off, washed twice with small quantities of water and the combined filtrate was acidified to pH 3.0 to prevent thiol oxidation.

EXAMPLE 9: Reduction of Oxytocin

The reducing polymer used for the reduction of oxytocin was lipoic acid bound tp the ethylamino derivative of polyacrylamide synthesized and converted to dihydrolipoyl derivative as described in the foregoing examples. There was used as 3 ml column filled with this polymer, which was equilibrated with 0.05 M tris-Cl, pH 8.0 prior to its use.

A sample of 5 μ moles of oxytocin was dissolved in 50 μl of 0.1 M HCl and brought to pH 8.0 by addition of 0.5 ml of 0.1M tris-Cl pH 8.0. Oxytocin which patially precipitates at this pH was applied in the form of a cloudy suspension and the column was closed. After 3 hours the soluble oxytoceine was eluted with 0.05 M tris-Cl buffer at pH 8.0 and immediately acidified to pH 2.0. The reduction of the hormone was quantitative, as determined by the Ellman method.

We claim:

1. A reducing polymer comprising dihydrolipoic acid bound to a water-insoluble polymeric amino-group containing carrier.

2. A reducing polymer according to claim 1, wherein the carrier is a member of the group selected from derivatives of cellulose, Sephadex, Sepharose, polyacylamides and polystyrene.

3. A reducing polymer according to claim 1, wherein the polymer is aminoethyl cellulose, aminoethyl Sephadex, aminoethyl polyacrylamide or aminoethyl polystyrene.

4. A process for the production of reducing polymers according to claim 1, which comprises
    covalently binding lipoic acid to a polymeric carrier by reaction between a lipoic acid derivative and said carrier, said derivative being present in an amount sufficient with respect to said carrier to provide in the final product the ability to quantitatively reduce the disulfide bonds in peptides containing cysteine and other disulfides brought into contact with said peptides, and said reaction being carried out under such conditions to bound said lipoic acid to said polymeric carrier; and
    reducing the thus obtained polymer to provide the final product.

5. A process according to claim 4, wherein the reduction is effected by means of sodium borohydride.

6. A reducing polymer according to claim 1 selected from the group consisting of

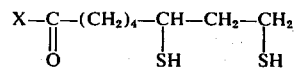

and

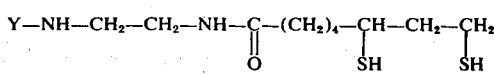

wherein X is aminothyl cellulose or aminoethyl Sephadex, and Y is Sephadex or Sepharose activated with cyanogen bromide.

7. A reducing polymer according to claim 1, wherein said carrier is the ethylamino derivative of polyacrylamine.

8. A process in accodance with claim 4, wherein said lipoic acid derivative is lipoyl succinimide, or mixed anhydride from lipoic acid with triethylamine and isobutyl chloroformate.

9. A process in accordance with claim 4, wherein said reaction is carried out at ambient temperature.

* * * * *